UNITED STATES PATENT OFFICE.

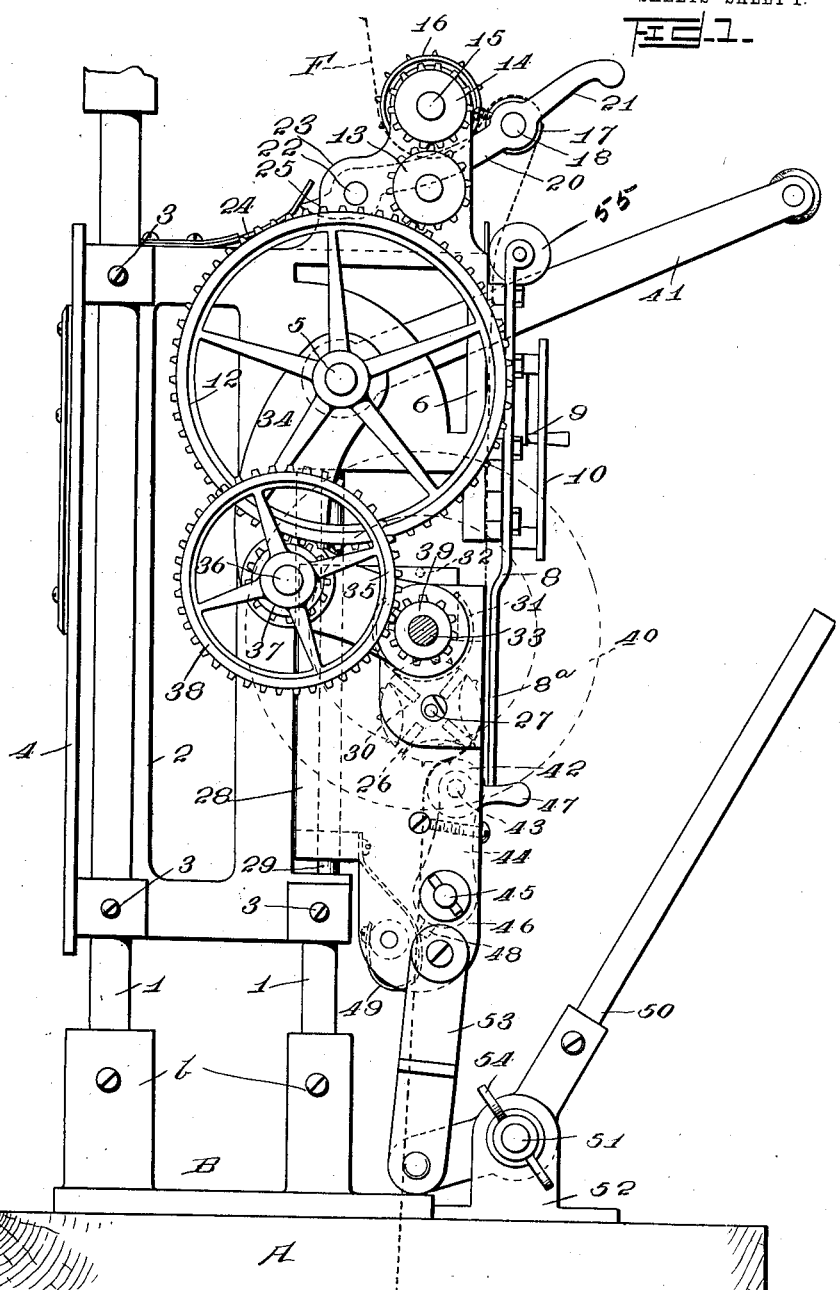

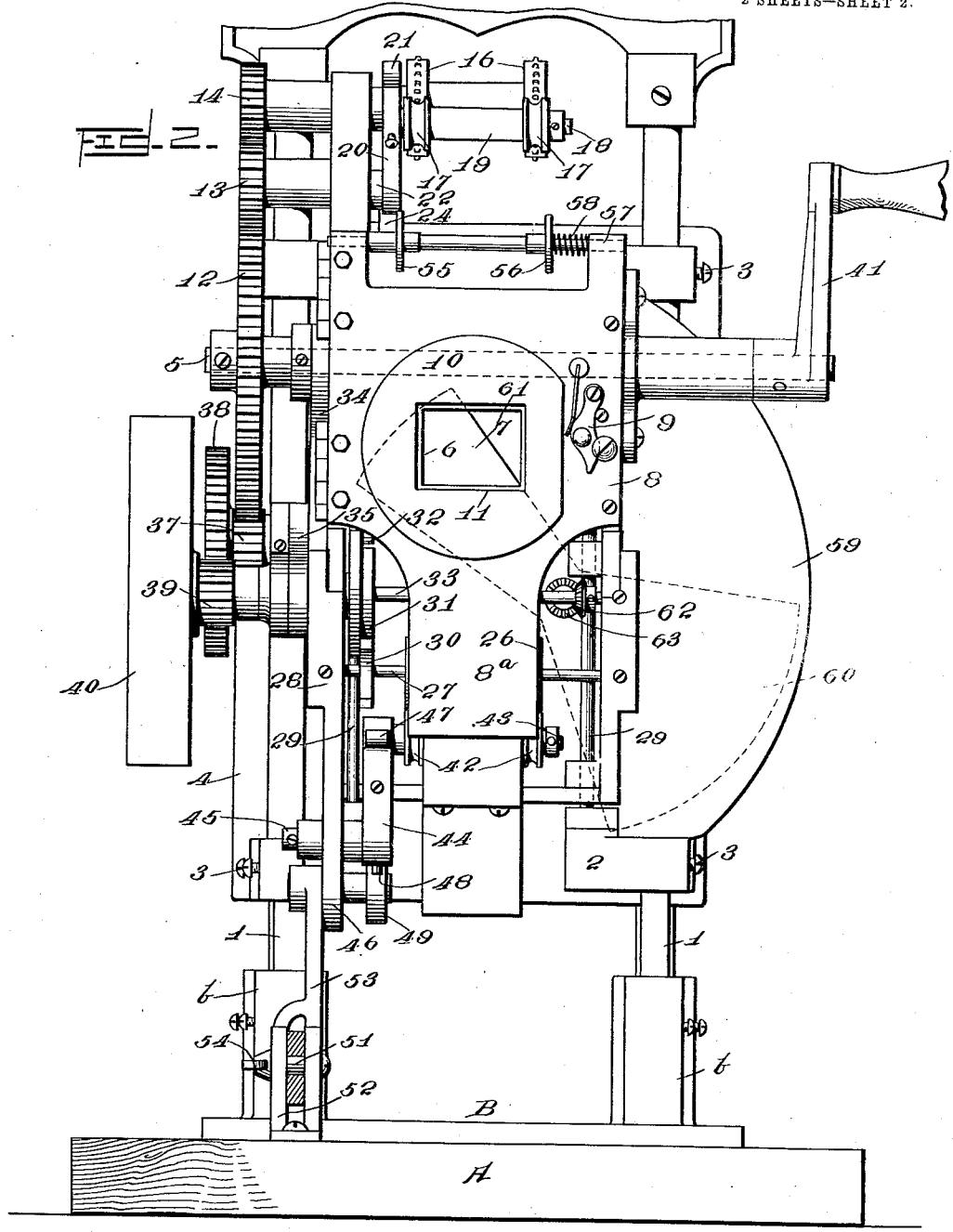

NICHOLAS POWER, OF NEW YORK, N. Y.

APPARATUS FOR EXHIBITING MOVING PICTURES.

No. 826,112.     Specification of Letters Patent.     Patented July 17, 1906.

Application filed March 29, 1905. Serial No. 252,663.

*To all whom it may concern:*

Be it known that I, NICHOLAS POWER, a citizen of the United States, residing in the city of New York, county of Kings, and State of New York, have invented new and useful Improvements in Apparatus for Exhibiting Moving Pictures, of which the following is a specification.

This invention relates to apparatus for displaying moving pictures, and more particularly to apparatus for displaying pictures which are arranged in series upon a translucent film which is fed intermittently across a projection-aperture in front of a suitable source of light for illumination.

The object of the invention is to improve apparatus of the type specified in respect to the devices employed for feeding the film across the projection-aperture and with respect also to the means employed for framing or centering the pictures in relation to the projection-aperture.

The invention also contemplates the provision of an improved shutter mechanism by means of which the variation in the light thrown upon the "sight" of the screen is reduced to a minimum and the unpleasant effect upon the eyes of spectators due to the flickering of successive pictures is largely eliminated.

With the objects above stated and others in view which will hereinafter appear the invention consists in certain features of construction, combination, and arrangement of parts shown in the accompanying drawings and fully described in this specification, the scope of the invention being clearly defined in the appended claims and it being clearly understood that changes in the structure disclosed may be made within the scope of the claims without departing from the spirit of the invention or sacrificing its advantages.

In the drawings, Figure 1 is a view in side elevation of the apparatus with the lenses and film-spools omitted for the sake of clearness, parts of the apparatus being indicated in dotted lines. Fig. 2 is a view in rear elevation of the structure as shown in Fig. 1.

Referring to the drawings, A designates the base-board, upon which the apparatus is mounted, and B designates a suitable foot-piece, which is securely fastened on the base-board and presents upwardly-extending sockets *b*, into which the supporting-standards 1 1 of the apparatus are set and suitably secured. The main frame 2 of the apparatus is adjustably mounted upon the standards 1, screws 3 being provided for that purpose. At the front of the apparatus a plate 4 is secured, which is provided with means for securing projecting lenses thereon in the usual manner. At the back the upper portion of the main frame 2 is extended rearwardly, and it affords support for the main driving-shaft 5 of the film-feeding mechanism as well as for the devices by which a sufficient amount of slack is maintained in the film between the supply-spool and the tension and guide devices by which the film is held in proper relation to the projection-aperture at the back of the apparatus. The rearward extension of the main frame 2 also affords support for a fixed plate 6, in which the projection-aperture 7 is framed. This plate 6 has hinged thereto at one side a door 8, which is provided with an opening registering with the projection-aperture when the door is closed. The door 8 is spaced at a slight distance from the plate 6 and is normally held closed by a latch 9. Upon the back of the door 8 is mounted a screen 10, having an opening 11 therein a little larger than the framing-aperture. This screen serves in a measure to protect the door 8 from the heating effect of the lighting apparatus, ordinarily an electric-arc lamp, which is employed in connection with the apparatus shown. The heat from the lamp is most intense of course around the projection-aperture, and hence the screen 10 is provided to protect that portion of the door 8, no protection being required for the other parts of the door. At the bottom the door 8 is extended downward, the extension 8ª serving as a shield for the film between the projection-aperture 6 and the lower film-feeding mechanism.

The film-feeding mechanism is operated from the main shaft 5 and includes the devices above mentioned which are fixed in position on the rearward extension of the main frame of the apparatus and devices arranged below said upward extension and mounted upon a shiftable carriage. The upper film-feeding devices are constant in operation and serve merely to maintain a sufficient amount of slack in the film above the guiding and tension devices by which it is held in proper relation to the projection-aperture. The lower film-feeding devices, however, are intermittent in operation and serve to draw the film across the projection-aperture at suitable intervals to permit the pictures carried by the film to be projected upon a screen and displayed to view while stationary.

Motion is imparted from the main driving-shaft 5 to a main driving-gear 12, which is fixed upon the shaft, and this gear meshes with a pinion 13, which in turn meshes with another pinion 14, which is fast upon the shaft 15, which bears the two sprockets 16 of the upper film-feeding mechanism. The film F, which is indicated in dotted lines, passes downward from the supply-spool and beneath the sprockets 16, with which it is held in engagement by a pair of grooved rollers 17, mounted on a short shaft 18, and connected by a sleeve 19, as shown. The shaft 18 is carried by a rocking lever 20, having one end extended to provide a handle 21, by which it may be operated. The lever 20 is fulcrumed on a pivot 22, fixed in the upward extension 23 of the main frame by which all the upper film-feeding devices are supported. The rollers 17 are held normally in contact with the sprockets 16 by means of a spring 24, which is secured upon the main frame 2 of the machine and engages a toe 25, formed at the forward end of the lever 20. When the handle 21 is depressed, the toe 25 rises and the action of the spring thereon tends simply to hold the lever stationary in the position in which it then is.

The lower film-feeding devices include a pair of sprockets 26, carried by a shaft 27, which turns in bearings provided for it in a carriage 28, which is slidably mounted on vertical guide-rods 29, suitably secured in the main frame of the apparatus. Intermittent motion is imparted to the sprockets 26 by means of an ordinary Geneva stop-wheel 30, mounted on the shaft 27, and a driving-wheel 31, bearing a single stud 32, for engagement with the stop-wheel 30. The stop-wheel and driving-wheel 31 being of standard construction, they are not illustrated in detail. It is to be noted, however, that as the stop-wheel has four slots for successive engagement by the stud 32 four revolutions of the driving-wheel 31 are required to produce one revolution of the stop-wheel. The four movements which are required for one complete revolution of the stop-wheel cause four pictures upon the film to come successively into position adjacent to the projection-aperture. In order to impart movement to the driving-wheel 31, which is carried by a shaft 33, turning in bearings in the carriage 28, a pair of links 34 and 35 are pivoted upon the shafts 5 and 33, respectively, and a short shaft 36 forms a pivotal connection between the links. Upon the shaft 36 a pinion 37 is mounted, which is constantly in mesh with the main driving-gear 12, and this pinion is rigidly connected with a gear 38. This gear is constantly in mesh with a pinion 39, which is fast upon the shaft 33, which bears the driving-wheel 31, that actuates the Geneva stop-wheel 30. In consequence of the arrangement of gears and pinions above described an operative connection is maintained at all times between the main driving-gear 12 and the driving-wheel 31, regardless of the movement that may be imparted to the carriage 28, with which the driving-wheel 31 is shiftable. Smoothness of movement of the driving-wheel 31 is produced by a fly-wheel 40, carried by the shaft 33 and preferably mounted at the left of the apparatus, as shown in Fig. 2, where it is entirely out of the way of the hand of the operator, which is employed to drive the entire apparatus by means of the crank 41, fixed upon the main driving-shaft 5.

The film is kept in engagement with the sprockets 26 of the lower feed mechanism by means of grooved rollers 42, similar to the rollers 17 above described. These rollers are mounted on a shaft 43, carried by a pivoted lever 44, which is mounted on a pivot 45, in an extension 46 at the lower end of the carriage 28. The lever 44 is provided with a projection 47 at its upper end, which serves as a handle, and at its lower end a lug 48 is provided for engagement with a spring 49, which serves to hold the lever 44 normally in position to press the grooved rollers 42 against the sprocket 26.

As will be readily seen, the movement of the lower film-feeding apparatus when the carriage 28 is raised or lowered will shift the film with reference to the projection-aperture 6 and will change the position of the pictures on the film in relation to this aperture. It is for the purpose of shifting the film in reference to the projection-aperture in order to effect the proper centering or framing of the pictures in the projection-aperture that means is provided for shifting the lower film-feeding mechanism. A decided advantage results from keeping the projection-aperture stationary and shifting the film relatively thereto instead of shifting the projection-aperture relatively to the film, as any movement of the projection-aperture changes the position of the sight on the screen.

The means which I preferably employ for raising and lowering the carriage 28 in order to effect the framing of the pictures consists simply of a lever 50, fulcrumed on a pivot 51 in a bracket 52, mounted on the base-board of the apparatus and a link 53, pivotally connected to the lever and to the extension 46 at the lower end of the carriage 28. To secure the carriage in proper position after it has been shifted to bring the pictures upon the film into proper relation to the framing-aperture, a wing-nut 54 or other equivalent device is provided for clamping the lever 50 at its pivotal point.

The adjustment of the carriage 28 insures the proper position of the film with respect to the upper and lower margins of the projection-aperture. In order to insure the proper positioning of the film with respect to the lateral margins of the projection-aperture, even when the films vary slightly in width, a pair of guide-disks 55 and 56 are rotatably mounted upon a rod 57 at the top of the door 8. The disk 55 is not laterally shiftable upon the rod, but the disk 56 is slidable on the rod and is pressed toward the disk 55 by means of a spring 58, the movement of the disk under the influence of the spring being limited. The position of the disk 55 being fixed in relation to the projection-aperture 7, one side of the film will always be in a certain relation to the projection-aperture, and the disk 56 being slidable on the supporting-rod any slight variations in width in films can be compensated for and lateral movement of the films between the guide-disks prevented.

The means which I employ for reducing the variations in the light thrown on the screen during the operation of the apparatus, thereby eliminating much of the eye strain which is ordinarily felt by spectators viewing moving pictures, consists of a special form of shutter 59. This shutter consists of two oppositely-arranged blades or wings 60 and 61, of which the former is considerably wider than the latter. The wing 60 is of sufficient width to cover the projection-aperture 7 completely while the stop-wheel 30 is in motion and the film is being drawn across the projection-aperture. The narrower wing 61, which is arranged opposite to the wing 60, passes in front of the projection-aperture while a picture is being displayed upon the screen. The passage of this narrower shutter-wing lessens the flickering effect by reducing somewhat the brilliancy of the illumination on the screen and by increasing the frequency of changes in the illumination upon the screen. By lessening the brilliancy of the display on the screen the contrast between the appearance of the screen when the light is entirely cut off and when the picture is displayed thereon is lessened and by increasing the frequency in the changes of the illumination on the screen the impressions upon the retina are diminished in intensity and persistence. As may be seen in Fig. 2, one revolution of the shutter takes place for each movement of the film, the shutter being rotated by two intermeshing beveled gears 62 and 63 of the same diameter, one of said beveled gears being mounted on the shaft 33 and being driven thereby.

The operation of the machine having been partially indicated in the foregoing description, it need not be described in detail here. The film having been introduced into position, as shown in Fig. 1, with the supply-spool above the apparatus in convenient proximity thereto, the lenses and light are properly adjusted to focus the pictures upon the screen and motion is then imparted to the film-feeding mechanism and the shutter by turning the crank 41. The position of the pictures on the screen will show whether the carriage 28 requires adjustment to frame the pictures properly, and the lever 50 may then be raised or lowered as required in order to center the pictures accurately in the framing-aperture.

Having thus described my invention, what I claim as new and desire to secure by Letters Patent, is—

1. In apparatus for exhibiting moving pictures, a shiftable carriage, film-feeding mechanism carried thereby, a main driving-gear turning about a fixed axis, and means for maintaining continuously an operative connection between said main driving-gear and the film-feeding mechanism.

2. In apparatus for exhibiting moving pictures, a shiftable carriage, film-feeding mechanism mounted on the carriage, a main driving-gear turning about a fixed axis, and shiftable intermediate gearing constantly in operative connection with both said main driving-gear and said film-feeding mechanism.

3. In apparatus for exhibiting moving pictures, a shiftable carriage, film-feeding mechanism mounted on said carriage and comprising a pinion, a main driving-gear turning about a fixed axis, intermediate gearing between said main driving-gear and said pinion and constantly in mesh with both, said intermediate gearing moving in an arc having the axis of the main driving-gear as a center.

4. In apparatus for exhibiting moving pictures, a main driving-gear turning about a fixed axis, a shiftable film-feeding mechanism including a pinion, a pair of pivotally-connected links, one of said links turning about the axis of the main driving-gear and the other turning about the axis of said pinion, and intermediate gearing connecting said main driving-gear and said pinion, said intermediate gearing being mounted on the pivot connecting said links.

5. In apparatus for exhibiting moving pictures provided with a fixed projection-aperture, a carriage arranged for vertical movement beneath said projection-aperture, a main driving-gear turning about a fixed axis, film-feeding mechanism mounted on said carriage, and shiftably intermediate gearing constantly in operative connection with said main driving-gear and said film-feeding mechanism.

6. In apparatus for exhibiting moving pictures, a main driving-gear, film-feeding mechanism mounted on a fixed support and driven by said main driving-gear, and shiftable film-feeding mechanism also driven by said main driving-gear.

7. In apparatus for exhibiting moving pictures, continuously-operative film-feeding mechanism mounted on a fixed support, and intermittently-operative film-feeding mechanism mounted on a shiftable carriage.

8. In apparatus for exhibiting moving pictures, the combination with a member provided with a projection-aperture, of a rotatable shutter having two oppositely-arranged wings held in fixed relation to each other and adapted to successively interrupt the passage of light through the projection-aperture, one of said wings being wider than the other.

9. In apparatus for exhibiting moving pictures, the combination with a member having a projection-aperture, of a rotatable shutter having a wide wing and a narrow wing permanently held in opposite relation to each other and both adapted to interrupt the passage of light through the projection-aperture, intermittently-operative film-feeding mechanism, and means for rotating the shutter, said shutter-rotating means and film-feeding mechanism being so arranged that the wide wing of the shutter covers the projection-aperture during the movement of the film.

In testimony whereof I have signed my name in the presence of two witnesses.

NICHOLAS POWER.

Witnesses:
  BAXTER MORTON,
  H. RICHARD WÖBSE.